Figure 1:
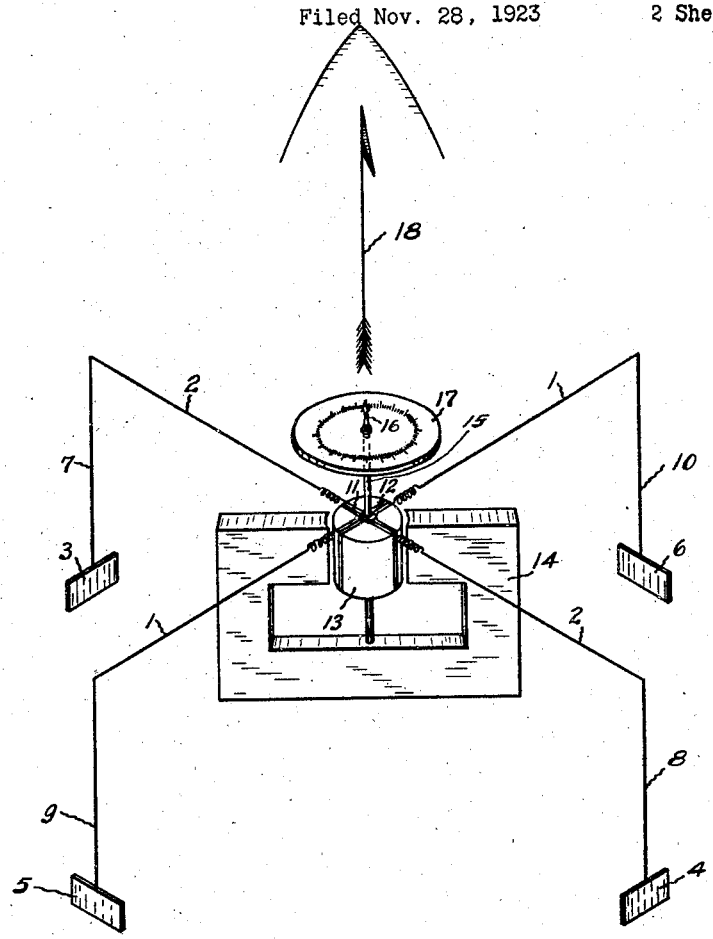

June 14, 1927.  
F. G. SIMPSON  
1,632,567  
SPEED AND COURSE INDICATOR FOR CONVEYANCES  
Filed Nov. 28, 1923  2 Sheets-Sheet 1

INVENTOR  
*Frederick Grant Simpson*  
BY  
*Fred C. Matheny*  
ATTORNEY

June 14, 1927.

F. G. SIMPSON 1,632,567

SPEED AND COURSE INDICATOR FOR CONVEYANCES

Filed Nov. 28, 1923    2 Sheets-Sheet 2

INVENTOR
Frederick Grant Simpson
BY
Fred G. Matheus
ATTORNEY

Patented June 14, 1927.

1,632,567

UNITED STATES PATENT OFFICE.

FREDERICK GRANT SIMPSON, OF SEATTLE, WASHINGTON.

SPEED AND COURSE INDICATOR FOR CONVEYANCES.

Application filed November 28, 1923. Serial No. 677,471.

This invention relates to a method of, and apparatus for, measuring the velocity, and indicating the direction of motion, of a terrestrial body relative to the surface of the earth and is in the nature of an improvement on the invention disclosed in my prior application Serial No. 655,747, filed August 4, 1923, Patent No. 1,596,380, dated Aug. 17, 1926. More specifically, this invention embodies means for determining the intensity of the vertical component of the earth's magnetic field and the rate at which it is cut by an electrical conductor which is carried by a moving body supported by sea-water, or other electrically conductive medium, which does not partake of the motion of such body relative to the earth's surface.

The object of the invention is to provide a simple, and easily applied method of ascertaining the characteristics of horizontal motion, namely the velocity, and its direction relative, and parallel, to the earth's surface, of a ship, or other water-craft, at sea.

A more particular object of the invention is to provide a method of generating electrical energy, proportional to such velocity, and its direction with respect to the ship's head, of sufficient magnitude to permit of its measurement by means of instruments of comparatively rugged construction and, therefore, capable of continuous use under all normal operating conditions.

A further object of the invention is to provide means of determining variations, or changes, in the intensity of the vertical component of the earth's magnetic field to the end that such variations, or changes, may not introduce errors in the measurement of such velocity.

These objects are accomplished by providing, on the ship, a plurality of electrical conductors wherein electromotive forces are generated by, and are proportional to, the rate at which the movement of the ship, in a plane parallel to the earth's surface, causes them to cut the vertical component of the earth's magnetic field; the fixed positions of such electrical conductors with respect to the fore-and-aft center line of the ship, being so placed as to cause the magnitude of the electromotive forces so generated to be also functions of the direction of movement of the ship, in the plane herein defined, with respect to its head. The positions of these electrical conductors relative to each other, are so established that the simultaneous values of such electromotive forces may be combined, in effect, to actuate an electrical indicating instrument in a manner whereby the course of the ship is directly shown. Each extremity of each of these conductors is electrically connected with the sea by means of other electrical conductors placed in planes substantially parallel to the vertical component of the earth's magnetic field and perpendicular to the plane of the first mentioned, or cutting, electrical conductors, thereby constituting each cutting electrical conductor the active, or current generating, part of an electric circuit. Associated with, and forming parts of, these circuits are two electrical indicating instruments, one, of which, shows the velocity of the ship in the direction of its course, the other indicating such course with respect to the ship's head. There is also provided a system of electrical conducting coils, arranged to rotate about an axis perpendicular to the direction of the vertical component of the earth's magnetic field. This system of coils is connected to a commutator, forming a device similar to an ordinary bi-polar, direct current, dynamo-electric machine armature; and is arranged to be rotated on its axis by an electric, or other, constant speed driving motor. This system of rotating coils is electrically connected, by means of brushes, bearing upon the commutator, to an electrical indicating instrument which is adjusted to show the intensity of the vertical component of the earth's magnetic field as such field is cut by the rotating coils; all as will be understood from the following description in connection with the accompanying drawings.

Figure 2:
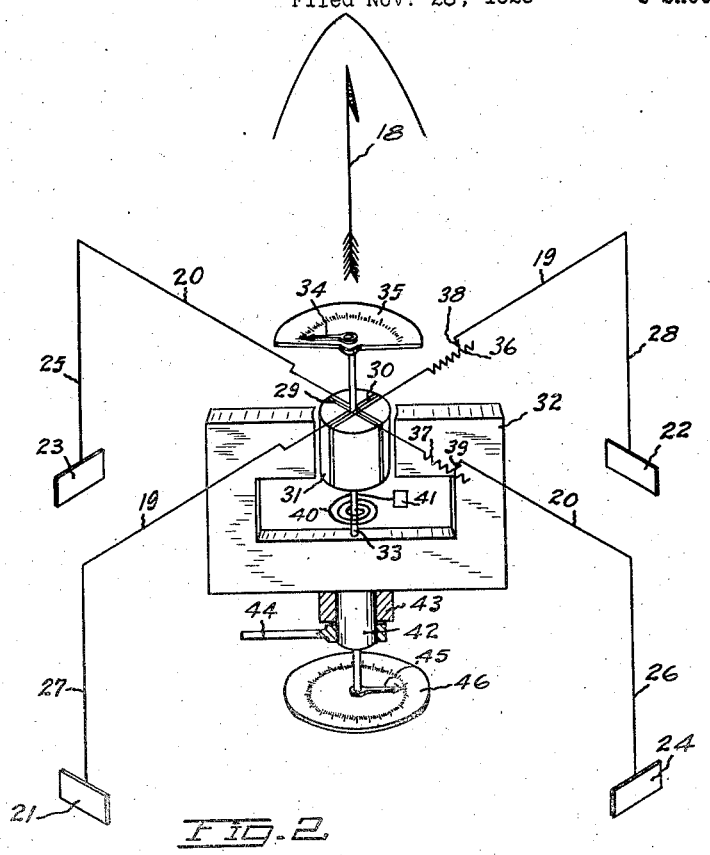
Figure 3:
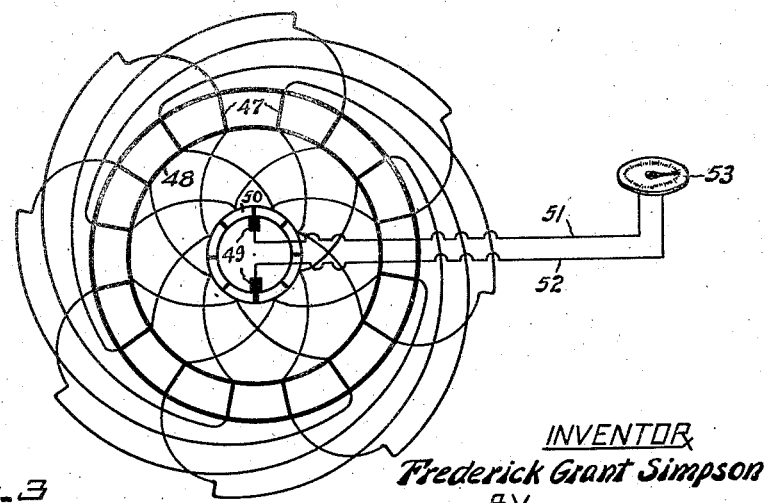

In the drawings Figure 1 illustrates, schematically, a typical form of my arrangement of electrical circuits, and electrical apparatus, on a ship, for the purpose of ascertaining its course. Figure 2 shows, similarly, a typical form of my arrangement of electrical circuits and electrical apparatus, on a ship, for the purpose of determining its velocity in the direction of its course. Figure 3 illustrates, diagrammatically one form of my circuit arrangement, on a ship, for the purpose of measuring the intensity of the vertical component of the earth's magnetic field.

Like reference numerals designate like parts throughout the several views.

Referring particularly to Fig. 1, the numeral 1 represents an electrical conductor, in the form of a wire or rod, extending diagonally, with respect to the deck of a ship upon which it is installed, in a plane parallel to the deck. A similar electrical conductor 2 is extended in the same plane, parallel to the deck, as, and at right angles to, conductor 1. The outer extremities of the conductor 1 are electrically connected to the electrically conducting ground plates 5 and 6 by means of electrical conductors 9 and 10 respectively. The outer extremities of conductor 2 are similarly connected to the electrically conducting ground plates 3 and 4 by means of electrical conductors 7 and 8 respectively. The conductors 7, 8, 9 and 10 are extended in vertical planes, that is to say, in planes perpendicular to that of the ship's deck, the latter being regarded in this description as horizontal. The ground plates 3, 4, 5, and 6 are attached to the outside of the ship's hull at points where they will, under all usual conditions, be entirely immersed in sea water. The conductors 1 and 2 may be installed either above or below the deck, care being exercised to protect them from mechanical injury and to shield them from varying magnetic fields of local origin. 11 and 12 are electrically conducting coils wound about the magnetic core 13, at right angles to each other. The magnetic core 13 is rigidly attached to, and is supported by, the shaft 15, around which it may rotate between the poles of the magnet 14. The shaft 15 is supported by suitable bearings and carries at one of its ends the pointer 16, to which it is rigidly attached. The pointer 16 extends at right angles to the shaft 15 and rotates in a plane parallel to the plane of rotation of the core 13. The numeral 17 represents a graduated scale rigidly supported in a plane parallel to the plane of rotation of the pointer 16, and concentric with the axis of rotation thereof. The entire circumference of the scale 17 is subdivided into three hundred and sixty equal parts, representing degrees, and is fixed in its position relative to the ship so that the point on the scale representing three hundred and sixty and zero degrees in common shall indicate the direction of the head of the ship to an observer facing the head of the ship and occupying a position with respect to the scale opposite to the head of the ship. The pointer 16 and the scale 17 constitute a dial, whereby the position of the pointer 16 with respect to the scale 17 denotes an angle of bearing, of the direction indicated by the pointer, with respect to the head of the ship.

The coils 11 and 12 are electrically connected in series with the conductors 2 and 1, respectively by means of flexible connectors, or brushes and collector rings or, in any manner which permits the magnetic core 13 to rotate through an angle of three hundred and sixty degrees. The arrow 18 points in the direction of the head of the ship as apparent to an observer facing the head of the ship and occupying a position, with respect to the scale 17, opposite thereto.

In Fig. 2 the numerals 19 and 20 represent electrical conductors similar in every respect to conductors 1 and 2, and arranged as to position with respect to each other and to the ship in identically the same manner. Conductor 19 is electrically connected to the ground plates 21 and 22, at its outer extremities, by the vertical conductors 27 and 28 respectively. Conductor 20 is electrically connected to the ground plates 23 and 24, at its outer extremities, by the vertical conductors 25 and 26 respectively. The lower, or sea water, terminals of conductors 25, 27, 28 and 26 may be connected to the ground plates 3, 5, 6 and 4, in the respective order given, if desired, in which event the ground plates 23, 21, 22 and 24 are to be omitted. When used the ground plates 23, 21, 22 and 24 are attached to the outside of the ship's hull in the same manner as that previously described, herein, in connection with the ground plates 3, 5, 6 and 4. The numerals 29 and 30 represent electrically conducting coils wound about the magnetic core 31 in planes perpendicular to each other. The magnetic core 31 is rigidly attached to, and is supported by, the shaft 33, whereby it may rotate, through a limited angle, between the poles of the magnet 32. The shaft 33 is supported by suitable bearings and carries at one of its ends the pointer 34, to which it is rigidly attached. The pointer 34 extends at right angles to the shaft 33 and rotates in a plane parallel to the plane of rotation of the core 31. The numeral 35 represents a graduated scale, rigidly supported in a plane parallel to the plane of rotation of the pointer 34, and concentric with the axis of rotation thereof. The scale 35 may either occupy a quadrant or the semi-circumference of a circle, its graduations indicating units of the ship's velocity. The pointer 34 and the scale 35 constitute a dial, whereby the position of the pointer 34 with respect to the scale 35 denotes the velocity of the ship in a plane parallel to the earth's surface and relative thereto. The pointer 34 is held in its zero position, with respect to the scale 35, when the ship is at rest, by means of the spring 40 which is fastened to the shaft 33 and to the stationary bracket 41. The coils 29 and 30 are electrically connected in series with the conductors 20 and 19, respectively, by means of flexible conductors, or other suitable manner, so that the magnetic core 31 may rotate through an angle not necessarily exceeding one hundred and eighty degrees. The magnet 32 is supported by the shaft 42 and the bearing 43 and may be rotated, in a plane parallel to the plane of rotation of the core 31 by means of the handle 44. The numeral 45 represents a pointer, rigidly attached to the shaft 42, and at right angles thereto, which indicates by its position, relative to the graduated scale 46, angular movement of the magnet 32 in its plane of rotation as hereinbefore described. The scale 46 is divided into three hundred and sixty subdivisions representing degrees of arc. The variable resistance 36 is electrically connected in series with conductor 19 and is controlled by the switch 38. In a like manner the variable resistance 37 and the switch 39 are connected in series with conductor 20.

In Fig. 3 the numeral 47 represents electrical conductors wound in the form of the coils of any common type of direct current, drum wound, bi-polar, re-entrant armature, such as is used in direct current motors and generators. These conductors are wound on the non-magnetic supporting core 48, and are electrically connected to the bars of the commutator 50 in the same manner as that used in constructing the armatures of direct current, bi-polar, drum wound, dynamo-electric machines. The electric current, or potential, indicating instrument 53 is electrically connected to the conductors 47 by means of the electrical conductors 51 and 52, the brushes 49 and the commutator 50. The instrument 53 is adjusted and calibrated to show the intensity of a magnetic field, in centimeter-gram-second units, cut by the conductors 47 when the core 48 is rotated in a plane parallel to such field and perpendicular to the direction of their length, at a predetermined constant angular velocity; the position of the brushes 49, relative to the commutator 50, and to the direction of such magnetic field, being adjusted at a so called neutral point in a manner well known in connection with the operation of direct current dynamo electric machines. The core 48 and the commutator 50 are concentrically mounted upon a suitable shaft supported by suitable bearings, not shown, and driven at a constant speed by any suitable driving motor or engine, in a position wherein the axis of rotation lies in a plane perpendicular to the direction of the vertical component of the earth's magnetic field, and, preferably, occupies a position in that plane parallel to the horizontal component of the earth's magnetic field, the brushes 49 being adjusted to positions upon the commutator 50 which are electrically connected to those of conductors 47 wherein the rate of cutting of the vertical component of the earth's magnetic field, at any instant of time, is a minimum.

In prior application, Serial No. 655,747, filed August 4, 1923, I have described and claimed the method of measuring the velocity, and ascertaining the direction of motion, relative to the surface of the earth, and in a plane parallel thereto, of any conveyance, by providing upon such conveyance an arrangement of electrical circuits wherein electromotive forces are generated by, and proportional to, the rate at which the vertical component of the earth's magnetic field is cut by the electrical conductors of such circuits due to the velocity of the conveyance in the plane defined.

While the present invention involves certain devices, and methods included in the broad scope of my herein-before mentioned prior invention, it departs therefrom in its method of, and means for, utilizing the electromotive forces produced by the movement of a conveyance in a direction transverse to that of the vertical component of the earth's magnetic field. It also includes means for measuring the intensity of such vertical component and for applying the values so obtained to the end that variations and changes therein may not introduce errors in the measurement of the herein-before defined velocity. Furthermore the present invention includes means for the production of energy, in electrical form, of much greater magnitude than previously possible, by the action of the herein-before described electromotive forces.

Referring particularly to Fig. 1, let it be assumed that a ship, upon which there is mounted a device represented thereby, is proceeding upon a course designated by the angle $\phi$ with respect to the head of the ship. Let V represent the velocity of the ship, in the common plane of the conductors 1 and 2, in meters per second. Let H represent the intensity of the vertical component of the earth's magnetic field, cut by the conductors 1 and 2, in maxwells per square centimeter. Let L represent the length of each of the conductors 1 and 2 in meters. Let $E_1$ represent the electromotive force generated in conductor 1, due to the rate at which it cuts the vertical component of the earth's magnetic field, in millivolts. Let $E_2$, in millivolts, represent the electromotive force generated in conductor 2 due to the same cause. Let it be assumed that conductor 1 is fixed as to its length, in position relative to the fore-and-aft center line and head of the ship at an angle of forty-five degrees. Then conductor 2 will have its length disposed at an angle of one hundred and thirty-five degrees relative to such center line and head.

It may be shown that $$E_1 = \frac{VHL \sin. (45° - \phi)}{10}$$

and that $$E_2 = \frac{VHL \cos. (45° - \phi)}{10}.$$

I have found, in the circuit consisting of conductors 1 and 10, coil 12 ground plate 6, the sea-water, ground plate 5 and conductor 9, that electromotive forces other than $E_1$ may, in the practical application of this invention, be regarded as negligible. In a like manner I have found, in the circuit consisting of conductors 2 and 8, coil 11, ground plate 4, the sea-water, ground plate 3 and conductor 7, that electromotive forces other than $E_2$ may, in the practical operation of the device herein described, be disregarded. In the application of this invention for the purposes herein mentioned the sea-water may be regarded as a stationary part of each of the circuits, herein defined, in which part no appreciable electromotive force is generated due to the movement of the ship, and that such electromotive forces as may be generated in the conductors 9 and 10 by the same cause are of equal value and opposite to each other in direction; as is also the case as relative to such electromotive forces in conductors 7 and 8. I have found also that leakage of current between the two circuits by way of the sea-water is negligible, such cross currents approximately neutralizing the effect of each other. An electric current will, therefore, be established in coil 12, due and proportional to $E_1$. An electric current will also be established in coil 11 due and proportional to $E_2$. The values of these currents, relative to each other, will correspond to the simultaneous values of two simple harmonic or sinusoidal currents, of equal amplitude, in phase quadrature, when the individual phase angle of each of them is equivalent to $(45°-\phi)$. As the coils 11 and 12 are wound in space quadrature on the core 13, two magnetic poles of opposite polarity will be induced in such core at diametrically opposite points. The position of this pair of poles, with respect to the planes of the coils 11 and 12. will be determined by the angle $\phi$, their strength will be proportional to the common amplitude of the currents in coils 11 and 12.

Let it be assumed that the relative positions of the magnet 14, the core 13, the coils 11 and 12, the pointer 16 and the scale 17 are such that when the angle $\phi$ is equal to zero degrees that the magnetic poles in the core 13 are directly opposite the poles of the magnet 14 and are of opposite polarity thereto; and also that the pointer 16 points to zero degrees on the scale 17: then any change in the angle $\phi$ will produce a like change in the position of the magnetic poles in the core 13 and cause it to rotate on its axis through the same angle when its magnetic poles will again be directly opposite the poles of the magnet 14 and of opposite polarity thereto, thereby causing the pointer 16 to also rotate through the angle $\phi$ as indicated by its position relative to the scale 17. The course of the ship with respect to its head is, therefore, directly indicated by the position of the pointer 16 with respect to the scale 17.

Referring to Fig. 2, electric currents are established in the coils 30 and 29 by the electromotive forces generated in the conductors 19 and 20 respectively, in exactly the same manner, and of the same relative values, as has been described, hereinbefore, in connection with the currents in the coils 11 and 12. Let L equal the length of each of the conductors 19 and 20, in meters. Let $E_1$ equal the electromotive force generated in the conductor 19, by its velocity relative to the vertical component of the earth's magnetic field, in millivolts. Let $E_2$ be the electromotive force in millivolts, generated in conductor 20 by the same cause.

The strength of the magnetic poles induced in the core 31 by the currents in coils 30 and 29 will be proportional to the vector sum of $E_1$ and $E_2$, which is to say, to $$\frac{VHL}{10};$$

their position, with respect to the planes of the coils 30 and 29, will be determined by the angle $\phi$; these conditions being exactly the same as those described, herein, in connection with the magnetic polarity of core 13. By properly shaping the pole pieces or the magnet 32 and adjusting the spring 40, as is well known, the torque produced by the mutual action of the magnets 31 and 32 may be substantially equal to the counter-torque produced by the spring 40 when such magnetic torque causes the core 31 to rotate through an angle within the limits required for the purposes of this invention as hereinbefore defined. The relative positions of the magnets 31 and 32, at constant velocity, V, may be adjusted to be always the same at any angle, $\phi$, by rotating the magnet 32 through the same angle, by means of the handle 44, as indicated by the movement of the pointer 45 with respect to the scale 46. The position of the pointer 34, with respect to the scale 35, will then be an indication of the velocity, V, of the ship if the value, H, of the intensity of the vertical component of the earth's magnetic field, at the ship's exact position is known, and provided for in the calibration of the instrument herein discussed.

Referring to Fig. 3, let it be assumed that the armature consisting of conductors 47, core 48 and commutator 50 is rotating about its axis at constant speed. Its plane of rotation is parallel to the direction of the vertical component of the earth's magnetic field and the conductors 47 have their active, or generating, parts perpendicular thereto. Its axis of rotation is, preferably, adjusted to be parallel to the direction of the horizontal component of the earth's magnetic field, such direction having been ascertained by the use of a magnetic compass. The entire device is mounted on the ship in any convenient location where it is free from locally generated magnetic fields. The operating characteristics of this device, which may be properly considered a bi-polar, constant speed, direct current generator, without iron, or other material having magnetic properties substantially different from those of air in its magnetic circuit, its field consisting of the vertical component of the earth's magnetic field, may be readily deduced from the well known operating characteristics of any bi-polar, direct current generator having similar windings, the magnetic circuit, of which, consists of the usual magnetic material. The permeability of the magnetic circuit of the device herein described is substantially unity at all magnetic densities, and the losses therein are negligible. For the purpose of this invention the conductivity of the conductors 47, with respect to the magnitude of the electric current required, may be regarded as constant. The difference of electrical potential between the brushes 49 may, therefore, be considered as being directly proportional to the intensity of the vertical component of the earth's magnetic field. The instrument 53 is a direct current millivolt-meter, of any suitable type, its dial being calibrated to show the value H directly.

Referring again to Fig. 2, let it be assumed that the dial consisting of the pointer 34 and scale 35 has been adjusted to show the velocity, V, directly when H has the value 0.05 maxwells per square centimeter and the switches 38 and 39 are in contact with points on the resistances 36 and 37, respectively, where there is minimum variable resistance in circuit with the conductors 19 and 20, respectively. The points of contact between the switches 38 and 39 and the resistances 36 and 37, respectively, are marked by a scale graduated to show values of H greater than 0.05 maxwells per square centimeter whereby the resistance introduced in series with the conductors 19 and 20, when switches 38 and 39 are in contact with such respective points, will reduce the currents in the coils 30 and 29, respectively, to an amount equal to that of such currents at the same velocity, V, when the conductors 19 and 20 are cutting the vertical component of the earth's magnetic field of intensity H equal to 0.05 maxwells per square centimeter. By adjustment of the switches 38 and 39 to points on the resistance scales 36 and 37 indicated by the instrument 53, therefore, the velocity, V, of the ship is directly shown by the position of the pointer 34, with respect to the scale 35, at any field intensity greater than 0.05 maxwells per square centimeter.

As a practical example of the application of this invention let it be assumed that a ship at sea is proceeding on a compass course of thirty degrees, as shown by a standard United States Navy mariner's compass. After correction for the variation of the compass in the general locality of the ship, and its deviation, an apparent true course of one degree is indicated. It may be found that a course of three hundred and thirty six degrees is the actual true course, due to leeway, the pointer 16 being opposite the graduated mark three hundred and thirty-five degrees on the scale 17. The handle 44 is rotated until the pointer 45 is opposite the graduated mark three hundred and thirty five degrees on the scale 46. The instrument 53 shows a field intensity of 0.1 maxwells per square centimeter. The switches 38 and 39 are adjusted to make contact with the resistances 36 and 37, respectively, at points marked 0.1 on their scales. The pointer 34 is then opposite the graduated mark ten knots on the scale 35. The ship is, therefore, proceeding upon a true course of three hundred and thirty six degrees at a speed of ten knots (approximately 5.148 meters per second); which is an indication that she is being deflected from her apparent course by wind, or other disturbing cause, twenty five degrees to the left, or port, side.

Let it be assumed that the length of each of the conductors 1, 2, 19 and 20 is sixteen meters. The strength of the magnetic poles induced in the cores 13 and 31 is then proportional to $$\frac{VHL}{10} = \frac{5.148 \times 0.1 \times 16}{10} = 0.828 \text{ millivolts,}$$

electromotive force in either the circuit including coil 11, or the circuit including coil 12, with respect to core 13; and to the same electromotive force in either the circuit including coil 29, or the circuit including coil 30, with respect to core 31; it being understood that coils 11, 12, 29 and 30 are identical in dimensions. The resistance of each of these circuits, external to that of coils 11, 12, 29 and 30 and of resistances 36 and 37, may be made less than one ohm, observing the limits of practical construction. The strength of the poles in core 31 will be but one half that of the poles in core 13 due to the addition of external resistances 36 and 37 in series with coils 30 and 29, respectively, to compensate for the change in the field strength, H, from 0.05 maxwells per square centimeter, for which the instrument containing coils 29 and 30 is calibrated, to 0.1 maxwells per square centimeter, the actual field intensity at the point of observation.

Let it be assumed that the active, or field cutting, length of each of the conductors 47 is 50 centimeters, and that the mean diameter of the core 48, taken on the circumference passing through the coils made up of the conductors 47, is 10 centimeters. Let it be also assumed that the total number of iconductors, 47, is 20000, and that their speed of rotation is 50 revolutions per second. The difference of electrical potential generated between the brushes 49 will therefore be $$\frac{50 \times 10 \times 0.1 \times 2 \times 50 \times 20000}{2 \times 100000000} = 0.5 \text{ volts.}$$

The instrument 53 is calibrated to show 0.1 maxwells per square centimeter under the conditions herein defined.

I have explained in my prior application Serial No. 655,747, hereinbefore mentioned, the way in which the ship's true course, and velocity in that course, may be resolved into the component velocities produced by the various forces acting upon her to produce movement in a plane parallel to the earth's surface.

In the foregoing example it has been assumed that observations of speed and course were made at a time when the ship was riding on an even keel. By means of well known instrumentalities the degree of motion of the ship in planes other than that parallel to the earth's surface, and the degree of departure of the common plane of the conductors 1, 2, 19 and 20 from a plane parallel to that of the earth's surface, may be readily ascertained. Errors produced in the values indicated by the pointers 16 and 34, relative to their respective scales 17 and 35, by such changes in the ship's position, or movement, may be corrected by the exercise of simple mathematical processes, or by means of compensating devices attached to, or forming a part of, the course and speed indicating instruments herein described, such compensating devices being well known and in general use in connection with electrical measuring instruments of the same general type. Such errors are, however, usually slight and of insufficient importance to require correction.

It is obvious that many modifications, or changes, may be made in the shape, kind and arrangement of the various parts herein shown and described, without departing from the broad scope of my invention as set forth in the appended claims. While I have shown and described a particular form and kind of apparatus, I do not desire to be limited, or restricted, to any specific structure of apparatus, or its arrangement in elementary parts, the assemblage of which forms a means of accomplishing the purpose hereinbefore stated, in substantially the manner as herein described and included in the claims.

Having set forth the nature of my invention, and a means of accomplishing the purpose thereof, what I claim as new and useful and of my own invention, and desire to secure by Letters Patent is:—

1. Measuring devices of the class described embodying a plurality of electrically separated electrically conductive elements carried on a conveyance movable in an electrically conductive medium and arranged to cut the vertical component of the earth's magnetic field, at the velocity of said conveyance in a plane parallel to the earth's surface, whereby electromotive forces proportional to the rate at which said vertical component of the earth's magnetic field is cut will be generated, means including in part said electrically conductive medium for completing the circuits of which said electrically conductive elements form a part and means for utilizing said electromotive forces to determine the characteristics of horizontal motion of said conveyance.

2. Measuring devices of the class described, embodying a plurality of electrically separated electrically conductive elements carried on a ship in a normally horizontal plane and arranged to cut the vertical component of the earth's magnetic field at the velocity of the ship when said ship is moved in a plane parallel to the earth's surface, whereby electromotive forces will be generated, normally vertical conductor members arranged to connect the ends of said electrically conductive elements with the water in which said ship is disposed and means for utilizing said electromotive forces to determine the characteristics of motion of a ship in a plane parallel to the earth's surface.

3. Measuring devices of the class described, embodying two electrically conductive electrically separated elements supported, at right angles to each other and in a normally horizontal position, on a conveyance movable in an electrically conductive medium whereby movement of said conveyance in a plane parallel to the earth's surface will cause said electrically conductive elements to generate electromotive forces by cutting the vertical component of the earth's magnetic field, normally vertical conductor members connecting the ends of said horizontal electrically conductive elements with the electrically conductive medium and means for utilizing said electromotive forces for determining the characteristics of motion of a ship in a plane parallel to the earth's surface.

4. Devices for measuring the movement of a vessel in water in a plane parallel to the earth's surface, embodying normally horizontally electrically conductive elements arranged to cut the vertical component of the earth's magnetic field at the velocity of said vessel, whereby electromotive forces will be generated therein, means for completing the circuits embodying said electrically conductive elements and magnetic indicator means arranged to be actuated by electric currents produced in said circuits by said electromotive forces to indicate the horizontal characteristics of motion of said vessel.

5. Measuring devices for use on a ship, embodying an electrically conductive element disposed in a substantially horizontal plane at an angle of forty five degrees to the fore and aft center line of the ship, another electrically conductive element disposed in a substantially horizontal plane and at right angles to said first named electrically conductive element, said two electrically conductive elements being arranged to cut the vertical component of the earth's magnetic field at the velocity of said ship, whereby electromotive forces proportional to the rate at which said vertical component is cut will be generated therein, said electromotive forces being capable of being utilized to afford information relative to the movement of the ship.

6. Measuring devices of the class described embodying two electrically conductive elements supported in a substantially horizontal plane at right angles to each other on a moving body and arranged to cut the vertical component of the earth's magnetic field, at the velocity of said moving body and in a plane parallel to the earth's surface, whereby electromotive forces will be generated therein, a magnet, a magnetic core rotatably disposed between the poles of said magnet, two coils wound about said magnetic core at right angles to each other and connected with the respective electrically conductive elements whereby opposite poles will be induced in said magnetic core by electric currents produced by said electromotive forces thereby tending to rotate said magnetic core and indicating devices connected with said magnetic core.

7. Measuring devices for use on a body movable relative to the earth, embodying two electrically conductive elements carried by said body in a normally horizontal plane at an angle relative to each other and arranged to cut the vertical component of the earth's magnetic field at the velocity of said moving body and in a plane, parallel to the earth's surface, whereby an electric current will be generated therein, a magnet, a magnet core pivoted between the poles of said magnet, means for adjusting the position of said magnet angularly around said magnet core, two coils wound about said magnet core at right angles to each other and connected with the respective electrically conductive elements whereby opposite poles will be induced in said magnet core for rotating the same and indicating devices connected with said magnet core.

8. Measuring devices for use on shipboard, embodying two electrically conductive elements carried on a ship in a normally horizontal plane at an angle to each other and at an angle to the fore and aft center line of the ship and arranged to cut the vertical component of the earth's magnetic field, in a plane parallel to the earth's surface and at the velocity of said ship, whereby electromotive forces will be generated therein, means connecting the extremities of said electrically conductive elements with the water supporting the ship, a magnet having two oppositely disposed poles, a magnet core rotatively supported between said magnet poles, two coils on said magnet core arranged at right angles to each other and connected with the respective electrically conductive elements and indicating means operated by rotary movement of said magnet core.

9. Measuring device of the class described, embodying two electrically conductive elements supported in a normally horizontal plane and disposed at an angle relative to each other and arranged to be moved relative and parallel to the earth's surface in a manner to cause said elements to cut the vertical component of the earth's magnetic field and thereby generate electromotive force, a magnet having opposite poles, a magnet core rotatably mounted between said magnet poles, two coils on said magnet core arranged at right angles to each other and electrically connected with the respective electrically conductive elements whereby said coils will be energized by electric currents produced by said electromotive force from said electrically conductive elements and means for varying the electric current admitted to said coils relative to the electromotive force generated by said elements.

10. Measuring devices of the class described, embodying two electrically conductive elements supported in a normally horizontal plane and disposed at an angle relative to each other and arranged to be moved relative and parallel to the earth's surface in a manner to cause said elements to cut the vertical component of the earth's magnetic field and thereby generate electromotive force, a magnet having opposite poles, a magnet core rotatably mounted between said magnet poles, two coils on said magnet core arranged at right angles to each other and electrically connected with the respective electrically conductive elements whereby said coils will be energized by electric currents produced by said electromotive force from said electrically conductive elements and adjustable resistance means interposed in the circuit including each of said coils.

FREDERICK GRANT SIMPSON.